INVENTORS.
JACK E. CORNETT
WILLIS A. BOOTHE
DONALD L. REXFORD
ROBERT K. ROSE

ATTORNEY

Jan. 13, 1970   J. E. CORNETT ET AL   3,488,948
GAS TURBINE ENGINE TRANSIENT FUEL CONTROL
Filed April 29, 1968                   2 Sheets-Sheet 2
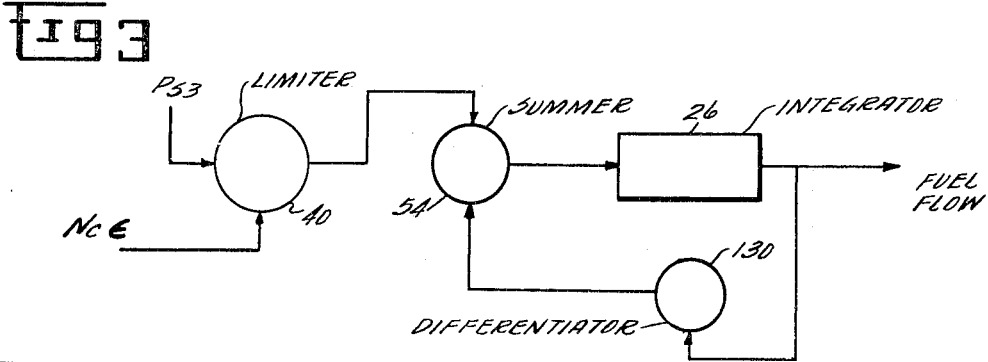
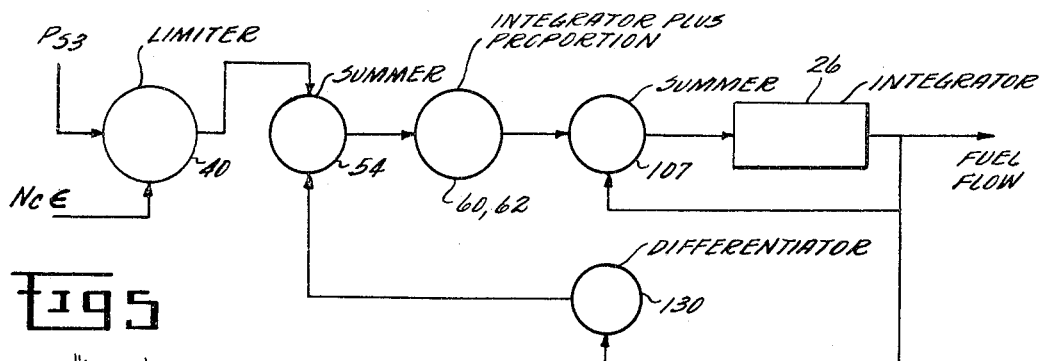
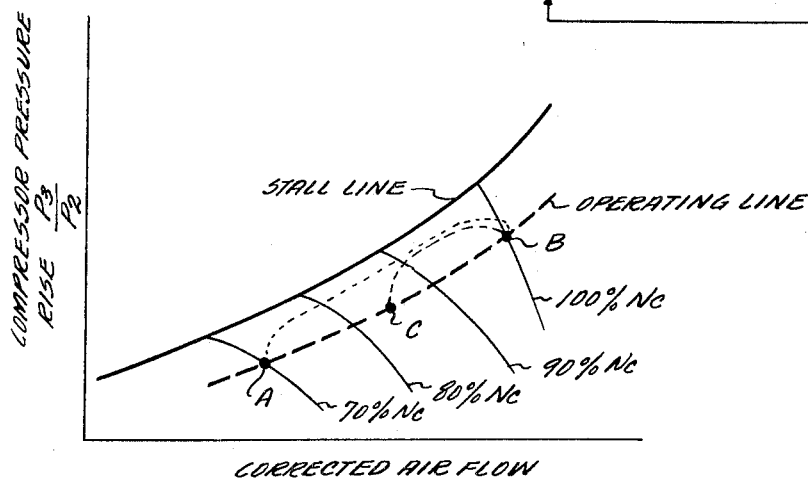
INVENTORS.
JACK E. CORNETT
WILLIS A. BOOTHE
DONALD L. REXFORD
ROBERT K. ROSE

United States Patent Office

3,488,948
Patented Jan. 13, 1970

3,488,948
GAS TURBINE ENGINE TRANSIENT FUEL CONTROL
Jack E. Cornett, Cincinnati, Ohio, and Willis A. Boothe, Scotia, Donald L. Rexford, Schenectady, and Robert K. Rose, Burnt Hills, N.Y., assignors to General Electric Company, a corporation of New York
Filed Apr. 29, 1968, Ser. No. 724,727
Int. Cl. F02c 9/04; F15c 1/08, 1/12
U.S. Cl. 60—39.28    7 Claims

ABSTRACT OF THE DISCLOSURE

A pilot-controlled throttle lever provides one input to a fluidic speed error signal generator. Engine speed and engine inlet air temperature provide the other inputs. If the corrected engine speed is other than what is called for by the setting of the throttle lever, there is a resultant fluidic error signal. This fluidic signal is then employed through fluidic elements to change the rate of fuel flow to the engine combustor to vary corrected engine speed to a value corresponding to the throttle lever. The fluidic circuit comprises a limit flueric amplifier, the power stream of which has a pressure corresponding to compressor discharge pressure. The function of this amplifier is to limit the rate of change in fuel flow to a value proportionate the compressor discharge pressure.

---

The present invention relates to gas turbine engines and, more particularly, to improved systems for controlling fuel flow thereto.

Gas turbine engines basically comprise a compressor, a combustor, and a turbine arranged in series flow relationship to generate a hot gas stream. Useful energy or power from the engine may be obtained by utilizing the the hot gas stream to drive a turbine having a power output shaft or by discharging the hot gas stream through a nozzle to obtain a propulsive force.

Engine power is basically a function of the rate of combustion of fuel and the density of the air entering the engine compressor. It is common practice to regulate operation of a gas turbine engine by maintaining a fuel flow to the combustor which will give a corrected engine rotor (the compressor and turbine rotor which are joined) speed, which, in turn, will give a power output corresponding to the setting of a demand lever which is controlled by the pilot or other operator of the engine. The setting of the pilot demand lever establishes a desired, corrected engine rotor speed. This signal is compared with the actual corrected engine rotor speed to generate an error signal. This error signal, in turn, increases or reduces fuel flow until the actual corrected engine rotor speed matches the demand speed, thereby nulling out the error signal and establishing a new rate of fuel flow to maintain a steady state power output from the engine.

While such a control signal is basic for most gas turbine engines today, it has long been recognized that the rate of fuel flow cannot be a direct function of the pilot demand lever, under large transient conditions where there is a demand input requiring or calling for a substantial change in the power output.

To further explain, if the rate of fuel flow were instantaneously increased from a minimum to a maximum value as a result of movement of the pilot demand lever, there would be a resultant increase in back pressure on the compressor (caused by increased rate of combustion) which would cause compressor stall and a consequent loss of engine power. Conversely, there would be a flameout and a loss of engine power, if fuel flow were decreased at too rapid a rate. Similarly, there could be overtemperaturing conditions or other harmful effects if there were such an instantaneous increase in fuel flow.

There have been many proposals for limiting the rate of change of fuel flow rates in order to avoid compressor stall and flameout during transient operating conditions. The limiting design factor and primary object of such systems has been to obtain an increase in the power output of the engine in a minimum time consistent with stall-free operation of the compressor as well as avoiding other harmful effects. Such systems have been safe and reliable in operation. However, they have been both complex and relatively expensive, particularly when utilized on engines used in the propulsion of aircraft, inasmuch as the transient control of fuel flow must provide safe operation of the engie over a wide range of altitudes and flight speeds.

One object of the invention is to simplify control systems, for gas turbine engines, which provide power output increases in a minimum time consistent with stall-free operation of the engine compressor and avoidance of other harmful effects and with the capability of providing such performance over a wide range of altitudes and flight speeds when the engine is employed in the propulsion of an aircraft. Further, it is an object of the invention to provide for transient control of fuel flow in the reduction of power output in a manner avoiding combustor flameout.

As can be deduced from the above, many problems are encountered in engine aircraft controls because of their operating environments. Not only is there a wide range of pressures and temperatures which are encountered in aircraft propulsion, but there are also vibration and G-loading factors which are essentially hostile to the mechanical, hydro-mechanical, and electrical components accepted by the state of the art as essential to generating the necessary signals and control functions requisite for controlling operation of a gas turbine engine, particularly under transient conditions.

Fluidics represents a relatively new art that provides means for generating signals and control systems with hardware which is essentially immune to many factors of such a hostile environment, particularly temperature and vibration, which limit the capabilities of electrical, electronic, and hydromechanical hardware now employed.

Another object of the invention is to adapt fluidic hardware to an engine control system in furtherance of the above objects and thereby obtain greater simplicity and reliability in the engine control system.

The above objects are attained by a control system including a control loop wherein means in the forward-going portion of the loop change the rate of metered flow of fuel to a turbine engine compressor proportionate to the value of a control signal input thereto. Means in the feedback portion of the control loop generate a signal reflecting the rate of change in metered fuel flow. These two means respectively provide integrating and differentiating action. The input to the loop is an error signal indicating a desired change in engine output, which signal is summed with the rate signal to provide the control signal input to the means for changing the rate of fuel flow. One of these signals is limited as a function of the engine compressor discharge pressure so that the rate of fuel flow increase is consistent with stall-free operation of the compressor and avoidance of other harmful effects.

Preferably the forwardgoing portion of the loop includes means for integrating the output of the summing means to provide one input to a second error and rate summing means. An inner loop is provided which includes means for generating a signal indicative of the actual rate of fuel flow. This fuel flow rate signal is fed to the second summing means, the output of which provides the control signal.

It is further preferable that the various control signals be generated by fluidic means wherein the error signal is connected to the control ports of a limit flueric amplifier and the power stream pressure of this amplifier is proportionate to the compressor discharge pressure. The output of this limit flueric amplifier will be proportionate to the error signal up to a limit value; the limit value will be variable as a function of compressor discharge pressure. With this simple and effective limit function increases in fuel flow do not cause compressor stall but rate of fuel flow change progressively increases as compressor discharge pressure rises so that increased power output may be obtained in a minimum time.

The above and other related objects and features of the invention will be apparent from a reading of the following description of the disclosure found in the accompanying drawings and the novelty thereof pointed out in the appended claims.

In the drawings:

FIGURE 3 illustrates a basic control loop of FIGURE 1 in an elemental fashion;

FIGURE 4 is a more detailed, elemental representation of the control loop of FIGURE 1; and FIGURE 5 is a plot illustrating the pressure rise and flow characteristics of a typical compressor.

Figure 1:
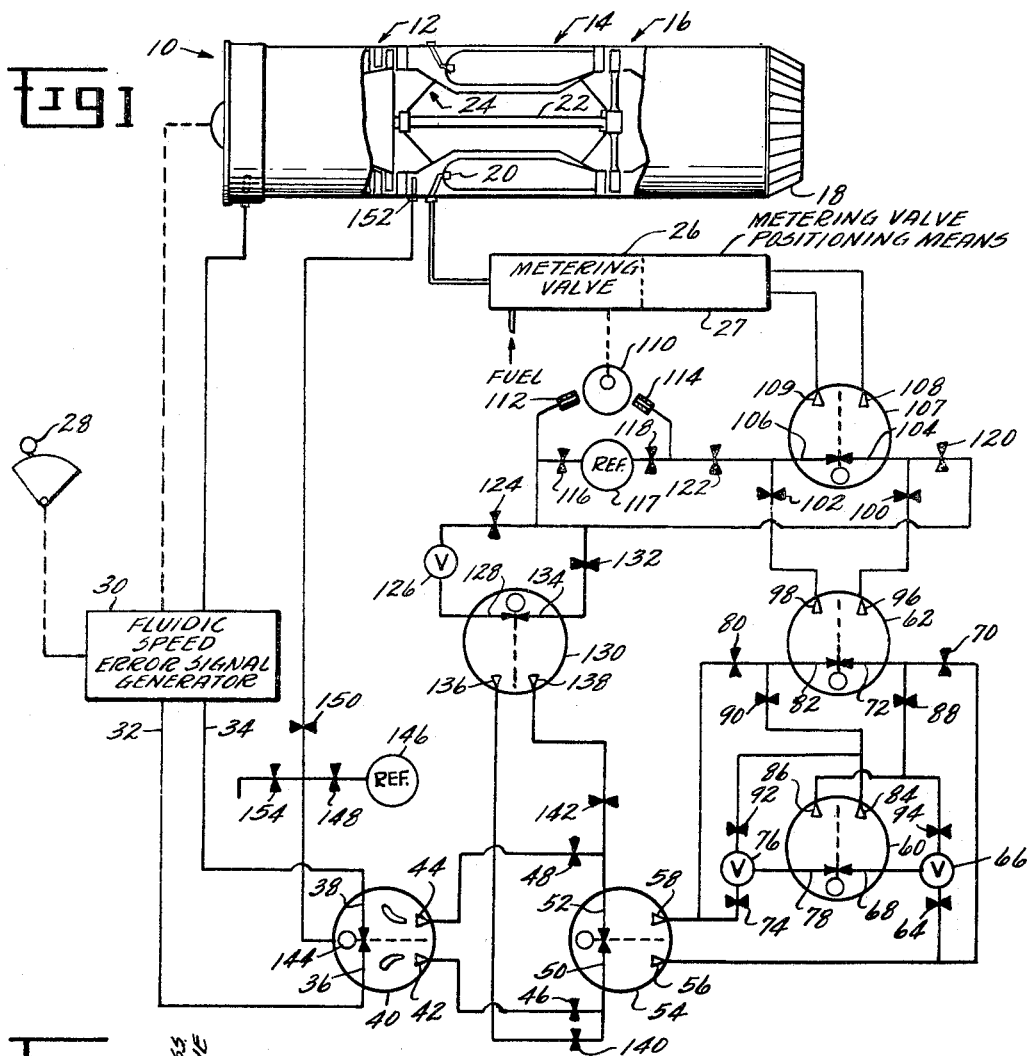
FIGURE 1 is a diagrammatic and schematic representation of a gas turbine engine and a control system embodying the present invention.

FIGURE 1 shows an illustrative gas turbine engine 10 comprising a compressor 12, a combustor 14, and turbine 16. The hot gas stream generated by these components is discharged through a nozzle 18 to produce a propulsive thrust for an aircraft in which the engine would be installed.

Air is pressurized by the compressor 12 and supports combustion of fuel, discharged from nozzles 20, within the combustor 14. The hot gas stream then drives the turbine 16 before being discharged from the nozzle 18. The compressor and turbine comprise bladed rotors joined by a shaft 22 to form an engine rotor 24.

Flow of fuel to the combustor nozzles 20 is metered by a valve 26. This valve may be of conventional construction having a piston (not shown), the position of which determines the opening or area of an orifice having a fixed pressure drop thereacross. Means, indicated at 27, selectively port fluid pressure to opposite ends of the piston to position the piston. The area of the metering valve orifice thus determines the rate of fuel flow to the combustor, and the means for changing and controlling piston position constitute the means for varying the rate of fuel flow.

The metering valve is regulated by the setting of a pilot-controlled throttle lever 28 through the control system of the present invention which will now be described in detail.

The throttle lever 28 provides a mechanical input to a fluidic corrected speed error signal generator 30. This signal generator also has a signal input $N_c$ indicating the physical speed of the engine rotor 24 and an input $T_2$ indicating the temperature of the air entering the compressor 12. The output of this signal generator is reflected by the pressure of air streams in two conduits or lines 32, 34. When the pressures in these two lines are equal, the rotor 24 is at the corrected speed demanded by the setting of the throttle lever 28. When corrected rotor speed is other than at demanded speed, there will be a corrected speed error signal represented by a differential pressure between the lines 32, 34. The magnitude of this differential reflects the difference between actual and demanded speed and the line with the greater pressure indicates whether an underspeed or overspeed exists.

The signal generator 30 is more fully described and claimed in U.S. application Ser. No. 751,005, filed July 25, 1968, which is a continuation application of now abandoned U.S. application Ser. No. 457,099, filed May 19, 1965, which is of common assignment with the present application.

The lines 32, 34 are respectively connected to the control ports 36, 38 of a flueric limit amplifier 40. The output receivers 42, 44 of this flueric amplifier are connected through orifices 46, 48 to the control ports 50, 52, respectively, of a summing flueric amplifier 54. The output receivers 56, 58 of the summing flueric amplifier provide inputs to an integrating flueric amplifier 60 and a second summing flueric amplifier 62. Thus receiver 56 is connected through orifice 64 and chamber or volume (V) 66 to one control port 68 of amplifier 60 and is connected through orifice 70 to one control port 72 of amplifier 62. Similarly the receiver 58 is connected through orifice 74 and volume 76 to the other control port 78 of amplifier 60 and through orifice 80 to the other control port 82 of the amplifier 62. The output receivers 84, 86 of amplifier 60 are also respectively connected to the control ports 72, 82 through orifices 88, 90. The receivers 84, 86 are also respectively connected as positive feedbacks to the control ports 78, 68 of the integrating amplifier 60, through an orifice 92 and the volume 76 and through an orifice 94 and the volume 66.

The output receivers 96, 98 of the summing amplifier 62 are respectively connected, through orifices 100, 102 to the control ports 104, 106 of a third summing flueric amplifier 107. The output receivers 108, 109 of the amplifier 107 are connected to the metering valve positioning means 27. Whenever there is a pressure differential between the receivers 108, 109, there will be a change in the position of the metering valve 26.

The following describes means for generating fluid signals respectively indicating the position of the metering valve and the rate of any change in its position. A cam 110 is mechanically connected to the metering valve so that its angular position reflects metering valve position and its rate of rotation indicates rate of change in metering valve positions. These parameters are respectively proportional to rate of fuel flow and rate of change in fuel flow.

A pair of tubes 112, 114 are directed towards and spaced from the cam 110. These tubes are pressurized from a fixed reference source 117 of pressurized air through orifices 116, 118. For any given position of the valve 26, there is a given relative spacing between the ends of the tubes 112, 114 and cam 110, and thus for any position of valve 26, there is a corresponding pressure differential between these tubes. This pressure differential provides a signal indicating metering valve position, which signal provides the second input to the amplifier 107 as tube 112 is connected to control port 104 through orifice 120 and tube 114 is connected to control port 106 through orifice 122.

The rate of change in the pressure in either of the tubes 112, 114 also indicates the rate of change of fuel flow. The tube 112 is connected through an orifice 124 and chamber volume (V) 126 to one control port 128 of a flueric differentiating amplifier 130. The tube 112 is connected through an orifice 132 directly to the other control port 134 of the differentiating amplifier 130. The output receivers 136, 138 of the amplifier 130 are connected respectively through orifices 140, 142 to the control ports 50, 52 of the summing amplifier 50.

The described flueric amplifiers may be fabricated in accordance with known techniques to provide necessary signal strength and proper relationships between input and output signals to provide the control functions now to be described. The flueric amplifiers described may each comprise several cascaded amplifying devices, interconnected in various ways, to attain the functions ascribed to a single stage device, within techniques understood and recognized by those skilled in this particular art.

In this connection the power streams (indicated by dashed lines) for the several flueric devices would preferably be derived from a fixed reference source of pressurized air, with one important exception. This exception is the limiting flueric amplfier 40. The power stream nozzle 144 for this amplifier is connected to a relatively low pressure reference pressure source 146, through an orifice 148 and also through an orifice 150 to a static pressure probe 150 at the discharge from the engine compressor 12. The power nozzle is also connected to the ambient atmosphere through an orifice 154. The reference source, the orifices 148, 150 and 154 and the nozzle 145 maintain a power stream pressure which is linearly proportional, or essentially so, to the pressure of the air discharged from the compressor 12, over a wide range of temperatures.

The described circuit is intended primarily for controlling fuel flow and engine operation after the initial start cycle has been completed and the rate of combuston of fuel is sufficient to sustain engine operation. The following description, therefore, assumes as its starting point that the engine rotor speed matches the required rotor speed for a setting of the throttle lever calling for a reduced power output from the engine.

At such a starting point there will be no pressure differential signal between the lines 32, 34, and no output from the amplifier 40. There will be output from the amplifier 54 since there is no input thereto from the amplifier 40, nor from the differentiating amplifier 130. There will, however, be an output from the integrating amplifier 60 and a resultant output from the amplifier 62 to the control ports of the amplifier 107. However, there will be no output, i.e., a pressure differential between receivers 108, 109, from the amplifier 107 because the pressure signals from the position sensing tubes 112, 114 maintain equal pressures in the control ports 104, 106.

Assuming next that the throttle lever 28 is displaced to a position demanding maximum thrust, there will be an instantaneous or step change in the pressure differential between the signal generator output lines 32, 34 and subsequent step inputs and outputs to the flueric amplifiers 40, 54, 62 and 107 resulting in a pressure differential which causes the fuel metering valve to be displaced to increase fuel flow.

Metering valve movement, in turn, results in a change in the position signal input from the sensor tubes 112, 114 to the summing amplifier 107. It also results in a pressure differential signal output from the differentiating amplifier 130 which is applied as a second input to the summing amplifiers 54.

There is one further signal change as a result of a step change in the output of the signal generator 30, namely the output of the integrating amplifier 60. When there is a change in the pressure differential signal input thereto from the amplifier 54 to the control ports 68, 78, the volumes 66, 76 prevent any instantaneous change in the pressure differential effective on the power stream of this amplifier. Instead, there is a progressive change and corresponding change in the output signal pressure differential at its receivers 84, 86. Thus, for a given pressure differential between the amplifier outputs 56, 68, there will be a given rate of change of the output signal from the integrating amplifier 60. This rate of change is also a function of the feedback connections from the receivers 84, 86 to the volumes 76, 66 respectively. These feedback connections have the further function of maintaining a given signal level output from the integrating amplifier when there is no input thereto from the amplifier 54. This will better explain the earlier statement that this is a signal output from the integrating amplifier 60 when there is no output from the signal generator 30 under steady state operating conditions.

Once the metering valve rate (and the rate of change in fuel flow) is at the rate represented by the signal output from the flueric amplifier 40, the negative summing of signals at the input to amplifier 54 nulls its output.

The functions of the various components described above have been referenced primarily to isolated or step changes in inputs. The system itself is, of course, dynamic in its action with the various changes having simultaneous and interrelated effects better understood by those skilled in the art by reference to a control loop representation.

The described control system provides a control loop, which is illustrated in elemental fashion in FIGURE 3. The speed error signal, $N_c e$, provides a signal input to the limiter 40. The output of the limiter 40 in no case will exceed a limit value which is a direct function of the compressor discharge pressure $P_{s3}$. The limit amplifier 40 output provides an input to the summing amplifier 54 which, in turn, produces a control signal which displaces the metering value 26. Since the metering valve 26 will move so long as there is a control signal input signal thereto, it functions as an integrator. Movement of the fuel valve produces a change in the rate of fuel flow. Movement of the fuel valve also provides an input to the differentiator 130, the output of which is fed into the summing amplifier 54. The transfer functions involved in a control loop containing an integrator and a differentiating feedback have the net result of producing a rate of change in fuel flow which is directly proportionate in magnitude to the signal input from the limiter 40 to the summing amplifier 54.

FIGURE 4 is a more complete loop diagram of the described control system illustrating that there are actually two control loops; the so-called outer loop includes the elements previously described in connection with FIGURE 3, and the inner loop comprises the means of providing an integrating plus proportional amplifier function provided by the integrating amplifier 60 and summing proportional amplifier 62. The inner loop further comprises the position feedback signal which is summed at the summing amplifier 107 to null out the position reference signal generated by the integrator 60. The addition of the inner loop adds additional stability to the circuit by eliminating hunting.

Figure 2:
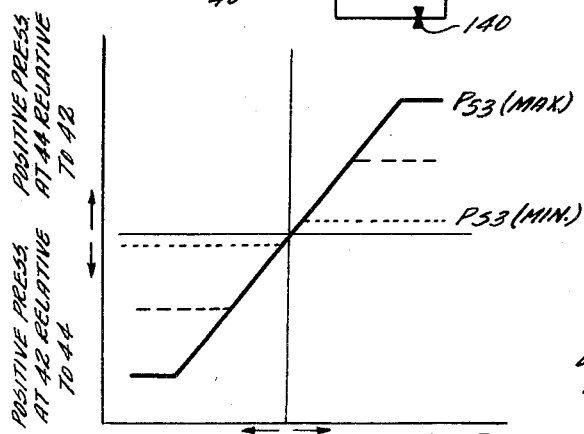
FIGURE 2 is a plot illustrating operating characteristics of a flueric element found in FIGURE 1.

From the preceding it will be apparent that the rate of change of fuel flow can never exceed a value determined by the compressor discharge pressure. This can be explained in further detail by reference to FIGURE 2, illustrating the operational characteristics of the limiting amplifier 40. The solid line plot in FIGURE 2 illustrates that as the pressure at control port 36 becomes greater or more positive, relative to the pressure at control port 38, the output pressure at receiver 44 becomes progressively greater, or more positive, relative to the pressure at receiver 42. As the signal pressure at port 36 becomes progressively more positive, the output pressure at receiver 44 becomes progressively more positive, in a linear fashion, until a maximum value is reached, whereat further increases in the positive value of the pressure at receiver 36 result in a limited fixed output pressure at receiver 44. Conversely, if the pressure at receiver 38 is greater, the pressure at receiver 42 becomes more positive, in a linear fashion, relative to the pressure at receiver 44, until a limit value is reached. Thus, there is a proportionate amplification of the speed error signal, represented by the pressure difference between the lines 32, 34, until a maximum limit value is reached. Further increases in the magnitude of the error signal will effect no changes in the limited output signal strength from the amplifier 44.

One flueric amplifier for obtaining such a variable limit it described in U.S. Patent No. 3,233,622—Boothe, of common assignment with the present application.

The magnitude of the output signal limit from the amplifier 40 is a function of the pressure of the power stream discharged from the nozzle 144. The solid line plot represents a maximum power stream pressure. If the pressure were reduced to one-half of its maximum value, the limit value would be reduced to one-half the maximum limit value, as indicated by the dashed line plots in FIGURE 2. Similarly at a minimum value of $P_{s3}$, the maximum output signal strength from amplifier 40 would be reduced to a proportionately lesser value, as indicated by the dotted line plot in FIGURE 2.

It would be apparent that the maximum signal input to the control loops, described above, varies as a direct function with the compressor discharge pressure regardless of the magnitude of the speed error signal. Since the error signal input to the control loop is limited in this fashion, the rate of change in fuel flow will be relatively low at low compressor discharge pressures and progressively higher at higher compressor discharge pressures.

The exact rates of change of fuel flow will depend on the operational characteristics of a given engine design. This is further illustrated by FIGURE 5 which is a plot of the operating characteristics of a typical compressor. This plot illustrates that for a given compressor when the pressure rise $(P_3/P_2)$ exceeds a given value for a given corrected air flow through the compressor, a stall condition will occur, as represented by the stall line on what is referred to as a compressor map. The dashed lines in FIGURE 3 represent lines of constant corrected engine rotor speed ($N_c$) from which it can be seen that if the pressure rise increases at a given engine rotor speed, there will be changes in corrected air flow and that a stall condition will be reached if the pressure rise continues to increase without any increase in the rotor speed. Also plotted on FIGURE 5 is an operating line which represents the corrected air flow and pressure rise for any steady state operation of the engine at a given engine speed. When it is desired to increase the power output of the engine from a minimum value, represented by point A, to a maximum value, represented by point B, it is necessary that the relationship between the pressure rise and corrected air flow be maintained below the stall line.

In accordance with the present invention it is possible to plot the rate of change of fuel flow which would give an acceleration schedule from operating point A to operating point B, represented by the dotted line therebetween, which would avoid compressor stall, overtemperaturing and other harmful effects. The rate of change in fuel flow is plotted solely as a function of compressor discharge pressure $P_3$. By the same token, if it were desired to accelerate from an intermediate point C to a maximum point B, the same parameter, i.e., compressor discharge pressure, can be employed to provide transient operation, which is safely maintained below the stall line and attains acceleration in a minimum of time and further compensates for pressure and temperature changes when operating at different altitudes and flight speeds. The empirically derived relationship between compressor discharge pressure and rate of change in flow rate can be introduced as a modifying factor in the construction of the metering valve 26. This is to say that the metering valve is displaced during a transient condition at a rate which is a linear function of the compressor discharge pressure, however, the rate of change in fuel flow can be non-linear by properly configuring the metering orifice in the piston which is moved to vary the orifice area. It is also possible that the same or improved results could be obtained by having a non-linear relationship between compressor discharge pressure and the limit output value of the amplifier 40.

The preceding description has dealt primarily with increases in engine power, however, the same system controls decreases as well. Thus, if a greater pressure on signal line 32 called for an increase in engine rotor speed and an increase in engine power, then a greater pressure on line 34 would call for a decrease in rotor speed and engine power. Fuel flow would be decreased at a limit rate proportionate to compressor discharge pressure which limit rate would prevent combustor flameout.

While it is preferred to generate signals fluidically in the manner described, it is contemplated, in the broader aspects of the invention, that other signals, e.g., electrical or mechanical, could also be employed.

Having thus described the invention, what is claimed as novel and desired to be secured by Letters Patent of the United States is:

1. A control system for a gas turbine engine comprising a compressor having a rotor, a combustor, and means for delivering fuel to said combustor, for combustion with an air stream pressurized by said compressor, to generate a hot gas stream,
    said control system comprising,
    means for metering the rate of fuel flow to said combustor,
    means for generating an error signal proportionate to the difference of the desired power output from the engine and the actual power output from the engine,
    a control loop comprising,
    means in the forwardgoing portion of said loop for changing the flow rate of said metering means at a rate proportionate to a control signal input thereto, thereby providing an integrating action,
    means in the feedback portion of said loop for generating a signal reflecting the rate of change in said metering means flow rate, thereby providing a differentiating action,
    means for summing the rate signal and the error signal to provide the control signal input to the means for changing the metering means, and
    means for limiting the magnitude of one of said signals as a direct function of the discharge pressure from said compressor,
    whereby the rate of change in fuel flow is proportionate to the magnitude of the error signal but does not exceed a limit value which proportionately increases with the compressor discharge pressure.

2. A control system as in claim 1 wherein,
    means are provided for variably limiting the magnitude of the error signal proportionate to the compressor discharge pressure.

3. A control system as in claim 2 wherein,
    the control loop further comprises in its forwardgoing portion,
    means for integrating the output of the rate signal and error signal summing means to provide an intermediate reference signal and a second summing means having as one input, said intermediate reference signal,
    said loop further comprising an inner loop including,
    means for generating a signal proportionate to the flow rate of said metering means, and
    means for connecting said flow rate signal to said second signal summing means whereby the output of said second summing means provides the control signal for the means for changing the metering means.

4. A control system as in claim 2 wherein,
    the means for generating the error, rate and control signals are fluidic means providing fluid signals of varying pressure values, and
    the means for limiting the error signal comprise a flueric amplifier having a power stream, receiver means downstream of said power stream, control port means for deflecting said power stream, said control port means being connected to said fluidic error signal generating means and means for controlling the pressure of said power stream as a direct function of the discharge from said compressor, whereby the recovered signal pressure from said receiver means will have a maximum limit value which varies as a direct function of the compressor discharge pressure.

5. A control system as in claim 4 in which the maximum limit value of the flueric amplifier varies as a linear function of compressor discharge pressure.

6. A control system as in claim 5 wherein a pressure tap is provided at the discharge of the compressor and a conduit is connected from said tap to the flueric amplifier through pressure reducing means.

7. A control system as in claim 4 in which the error signal generating means comprise, a pilot-controlled lever, a fluidic signal generator, said pilot-controlled lever providing a signal input to said signal generator representative of the desired corrected speed, and means providing signal inputs to said signal generator reflecting actual engine speed and the air temperature entering the compressor, said signal generator being responsive to said inputs to provide a differential output pressure signal, said signal being a corrected speed error signal representative of an overspeed or underspeed condition and its magnitude.

References Cited

UNITED STATES PATENTS

| | | | |
|---|---|---|---|
| 3,012,401 | 12/1961 | Harner | 60—39.28 |
| 3,139,922 | 7/1964 | Peczkowski | 60—39.25 X |
| 3,168,102 | 2/1965 | Tyler et al. | 60—39.28 X |
| 3,295,316 | 1/1967 | Beatrice et al. | 60—39.28 |
| 3,357,177 | 12/1967 | Cornett | 60—39.28 |
| 3,395,719 | 8/1968 | Boothe et. al. | 137—36 X |
| 3,426,777 | 2/1969 | Plummer | 60—39.28 X |

AL LAWRENCE SMITH, Primary Examiner

U.S. Cl. X.R.

137—36, 81.5